United States Patent
Fu et al.

(10) Patent No.: US 8,940,652 B2
(45) Date of Patent: Jan. 27, 2015

(54) PHOSPHORUS MODIFIED CRACKING CATALYSTS WITH ENHANCED ACTIVITY AND HYDROTHERMAL STABILITY

(71) Applicants: Qi Fu, Solon, OH (US); Chandrashekhar Pandurang Kelkar, Bridgewater, NJ (US); Gary Smith, Verona, NJ (US); Bilge Yilmaz, New York, NY (US)

(72) Inventors: Qi Fu, Solon, OH (US); Chandrashekhar Pandurang Kelkar, Bridgewater, NJ (US); Gary Smith, Verona, NJ (US); Bilge Yilmaz, New York, NY (US)

(73) Assignee: BASF Corporation, Florham Park, NJ (US)

( * ) Notice: Subject to any disclaimer, the term of this patent is extended or adjusted under 35 U.S.C. 154(b) by 157 days.

(21) Appl. No.: 13/668,429

(22) Filed: Nov. 5, 2012

(65) Prior Publication Data

US 2013/0115164 A1    May 9, 2013

Related U.S. Application Data

(60) Provisional application No. 61/555,637, filed on Nov. 4, 2011.

(51) Int. Cl.

| | | |
|---|---|---|
| *B01J 29/08* | (2006.01) | |
| *B01J 29/06* | (2006.01) | |
| *B01J 27/24* | (2006.01) | |
| *B01J 37/04* | (2006.01) | |
| *B01J 37/16* | (2006.01) | |
| *B01J 29/10* | (2006.01) | |
| *B01J 35/10* | (2006.01) | |
| *C01B 39/24* | (2006.01) | |
| *C10G 11/05* | (2006.01) | |
| *C10G 11/18* | (2006.01) | |
| *B01J 37/28* | (2006.01) | |

(52) U.S. Cl.
CPC ............... *B01J 27/24* (2013.01); *B01J 29/084* (2013.01); *B01J 37/04* (2013.01); *B01J 37/16* (2013.01); *B01J 37/28* (2013.01); *B01J 29/06* (2013.01); *B01J 29/106* (2013.01); *B01J 35/1019* (2013.01); *C01B 39/24* (2013.01); *B01J 2229/186* (2013.01); *B01J 2229/36* (2013.01); *B01J 2229/42* (2013.01); *C10G 11/05* (2013.01); *C10G 11/18* (2013.01)
USPC .............................................. 502/79; 502/86

(58) Field of Classification Search
CPC ............ B01J 27/24; B01J 37/04; B01J 37/16; B01J 37/28; B01J 35/1019; B01J 2229/36; B01J 2229/186; B01J 29/06; B01J 29/106; C01B 39/24
USPC ....................................................... 502/79, 86
See application file for complete search history.

(56) References Cited

U.S. PATENT DOCUMENTS

| | | | | |
|---|---|---|---|---|
| 3,595,611 | A * | 7/1971 | McDaniel et al. | 423/700 |
| 4,493,902 | A * | 1/1985 | Brown et al. | 502/65 |
| 6,069,012 | A * | 5/2000 | Kayser | 436/37 |
| 2009/0325786 | A1 * | 12/2009 | Liu et al. | 502/73 |

* cited by examiner

*Primary Examiner* — David M Brunsman
(74) *Attorney, Agent, or Firm* — Melanie L. Brown

(57) ABSTRACT

A phosphorus modification of an FCC catalyst is provided by reducing the sodium content of the as formed catalyst, a first treatment with a phosphate solution, a second ammonium exchange to further reduce the sodium content of the phosphorus solution treated catalyst and a second treatment with a phosphate solution.

19 Claims, No Drawings

US 8,940,652 B2

PHOSPHORUS MODIFIED CRACKING CATALYSTS WITH ENHANCED ACTIVITY AND HYDROTHERMAL STABILITY

FIELD OF THE INVENTION

The present invention relates to a phosphorus-containing catalyst prepared from a kaolin starting material and to a hydrocarbon catalytic cracking process utilizing the catalyst.

BACKGROUND OF THE INVENTION

Catalytic cracking is a petroleum refining process that is applied commercially on a very large scale. About 50% of the refinery gasoline blending pool in the United States is produced by this process, with almost all being produced using the fluid catalytic cracking (FCC) process. Currently, all commercial FCC catalysts contain a crystalline aluminosilicate zeolite, particularly synthetic faujasite, i.e. Zeolite Y in an amorphous or amorphous/kaolin matrix of silica, alumina, silica-alumina, kaolin, clay or the like.

Numerous work has been done to increase thermal-steam (hydrothermal) stability of zeolites through the inclusion of rare earth ions or ammonium ions via ion-exchange techniques to lower soda content, which is destructive to Zeolite Y. Thermally and chemically modified Zeolite Y, such as ultrastable zeolite Y (USY) and calcined rare-earth exchanged Y zeolite (CREY) are used commercially to convert heavy hydrocarbon feedstocks into more valuable products.

In prior art fluid catalytic cracking catalysts, the active zeolitic component is incorporated into the microspheres of the catalyst by one of two general techniques. In one technique, the zeolitic component is crystallized and then incorporated into microspheres in a separate step. In the second technique, the in-situ technique, microspheres are first formed and the zeolitic component is then crystallized in the microspheres themselves to provide microspheres containing both zeolitic and non-zeolitic components.

It has long been recognized that for a fluid catalytic cracking catalyst to be commercially successful, it must have commercially acceptable activity, selectivity, and stability characteristics. It must be sufficiently active to give economically attractive yields, it must have good selectivity towards producing products that are desired and not producing products that are not desired, and it must be sufficiently hydrothermally stable and attrition resistant to have a commercially useful life.

U.S. Pat. No. 4,493,902, the teachings of which are incorporated herein by cross-reference, discloses novel fluid cracking catalysts comprising attrition-resistant, high zeolitic content, catalytically active microspheres containing more than about 40%, preferably 50-70% by weight Y faujasite and methods for making such catalysts by crystallizing more than about 40% sodium Y zeolite in porous microspheres composed of a mixture of two different forms of chemically reactive calcined clay, namely, metakaolin (kaolin calcined to undergo a strong endothermic reaction associated with dehydroxylation) and kaolin clay calcined under conditions more severe than those used to convert kaolin to metakaolin, i.e., kaolin clay calcined to undergo the characteristic kaolin exothermic reaction, sometimes referred to as the spinel form of calcined kaolin. In a preferred embodiment, the microspheres containing the two forms of calcined kaolin clay are immersed in an alkaline sodium silicate solution, which is heated, preferably until the maximum obtainable amount of Y faujasite is crystallized in the microspheres.

In practice of the '902 technology, the porous microspheres in which the zeolite is crystallized are preferably prepared by forming an aqueous slurry of powdered raw (hydrated) kaolin clay ($Al_2O_3$:$2SiO_2$:$2H_2O$) and powdered calcined kaolin clay that has undergone the exotherm together with a minor amount of sodium silicate which acts as fluidizing agent for the slurry that is charged to a spray dryer to form microspheres and then functions to provide physical integrity to the components of the spray dried microspheres. The spray dried microspheres containing a mixture of hydrated kaolin clay and kaolin calcined to undergo the exotherm are then calcined under controlled conditions, less severe than those required to cause kaolin to undergo the exotherm, in order to dehydrate the hydrated kaolin clay portion of the microspheres and to effect its conversion into metakaolin, this resulting in microspheres containing the desired mixture of metakaolin, kaolin calcined to undergo the exotherm and sodium silicate binder. In illustrative examples of the '902 patent, about equal weights of hydrated clay and spinel are present in the spray dryer feed and the resulting calcined microspheres contain somewhat more clay that has undergone the exotherm than metakaolin. The '902 patent teaches that the calcined microspheres comprise about 30-60% by weight metakaolin and about 40-70% by weight kaolin characterized through its characteristic exotherm. A less preferred method described in the patent, involves spray drying a slurry containing a mixture of kaolin clay previously calcined to metakaolin condition and kaolin calcined to undergo the exotherm but without including any hydrated kaolin in the slurry, thus providing microspheres containing both metakaolin and kaolin calcined to undergo the exotherm directly, without calcining to convert hydrated kaolin to metakaolin.

In carrying out the invention described in the '902 patent, the microspheres composed of kaolin calcined to undergo the exotherm and metakaolin are reacted with a caustic enriched sodium silicate solution in the presence of a crystallization initiator (seeds) to convert silica and alumina in the microspheres into synthetic sodium faujasite (zeolite Y). The microspheres are separated from the sodium silicate mother liquor, ion-exchanged with rare earth, ammonium ions or both to form rare earth or various known stabilized forms of catalysts. The technology of the '902 patent provides means for achieving a desirable and unique combination of high zeolite content associated with high activity, good selectivity and thermal stability, as well as attrition-resistance.

The aforementioned technology has met widespread commercial success. Because of the availability of high zeolite content microspheres which are also attrition-resistant, custom designed catalysts are now available to oil refineries with specific performance goals, such as improved activity and/or selectivity without incurring costly mechanical redesigns. A significant portion of the FCC catalysts presently supplied to domestic and foreign oil refiners is based on this technology.

Catalysts which include phosphorous or phosphorous compounds have been described in U.S. Pat. Nos. 4,498,975, 4,504,382, 4,839,319, 5,110,776. These references disclose that the catalytic cracking activity and selectivity of zeolite catalysts may be improved by the addition of phosphorus.

For example, in accordance with the invention disclosed in U.S. Pat. No. 4,454,241, there is provided a catalyst comprising a crystalline alumino-silicate zeolite prepared from a clay starting material, a residue derived from said clay, and an effective amount of phosphorus, said catalyst having been prepared by the steps which comprise: (a) ion exchanging a clay derived alkali metal-containing Y-type crystalline aluminosilicate zeolite and the clay derived residue with a cation of a non-alkali metal to decrease the alkali metal content of said alkali metal-containing zeolite; (b) calcining the resulting ion exchanged zeolite and clay derived residue, and (c) contacting the resulting calcined zeolite and clay derived residue with a medium comprising an anion selected from the group consisting of dihydrogen phosphate anion, dihydrogen phosphite anion and mixtures thereof for a time sufficient to composite an effective amount of phosphorus with said calcined zeolite and residue.

U.S. Pat. No. 5,378,670 discloses the preparation of phosphorous modified zeolites/molecular sieves wherein a partially hydrogen, ammonium exchanged sodium zeolite/molecular sieve, is combined with a phosphorus compound, such as $H_3PO_4$ to obtain a phosphorus-containing zeolite/molecular sieve composition that is thermally treated (steamed) to obtain a phosphorus reacted zeolite/molecular sieve that is subsequently reacted with additional phosphorus compounds to obtain a phosphorus treated zeolite/molecular sieve that contains from about 2 to 7 weight percent $P_2O_5$. The steaming treatment is provided to yield an ultra-stable zeolite, having a reduced unit cell size relative to the starting material.

SUMMARY OF THE INVENTION

In accordance with the present invention, a phosphorus modification of a fluid cracking catalyst provided the catalyst with high hydrothermal stability and activity.

The catalyst microspheres of this invention are produced by the general process as disclosed in commonly assigned U.S. Pat. No. 4,493,902. After the crystallization process is terminated, the microspheres containing Y-faujasite are separated from the mother liquor by filtration. Typically, the microspheres contain more than about 8% by weight $Na_2O$. $Na_2O$ is reduced to about 2% by weight by ammonia ion exchange. The partially-exchanged material is added to a phosphate solution at 180° F. and pH of 2-5 to yield about 0.5 to 2% $P_2O_5$ on the catalyst. After filtration and washing, the sample is then rare earth exchanged at 180° F. to yield 0.25-1.5% REO on the catalyst.

The rare earth-exchanged material is dried and calcined and further ammonia ion exchanged to reduce $Na_2O$ to about 0.2%. The resulting material is again added to a phosphate solution at 180° F. and pH of 2-5 to yield about 2-4% $P_2O_5$ on the catalyst.

DETAILED DESCRIPTION OF THE INVENTION

The catalyst of the present invention comprises a Y-type crystalline aluminosilicate zeolite derived insitu from a kaolin starting material, as described, for example, in aforementioned U.S. Pat. No. 4,493,902. The catalyst comprises an effective amount of phosphorus to enhance the activity of the catalyst relative to the same catalyst without the incorporation of phosphorus by the specified method. Suitable amounts of phosphorus present in the catalyst include from at least about 2.0 weight percent, preferably from at least about 2.8 weight percent, more preferably from about 2.8 to about 3.5 weight percent phosphorus, calculated as $P_2O_5$, based on the weight of the zeolite plus kaolin derived matrix. By "Y-type zeolite" is intended herein a crystalline aluminosilicate zeolite, having the structure of faujasite, and having a silica to alumina mole ratio of at least about 3:1.

The catalyst of the present invention is characterized by its method of preparation to incorporate the phosphorus component. The Y-type crystalline aluminosilicate can be prepared by any known method of preparing a zeolite from kaolin and an additional source of silica to produce the high silica to alumina Y-type zeolite. The additional source of silica may be, for example, an alkali metal silicate salt or added exothermed koalin or an aqueous silica sol. Known methods of preparation include use of reaction mixtures containing kaolin and sodium silicate, and subsequent treatment with sodium hydroxide to form the zeolite; treatment of mixtures of exothermed kaolin and metakaolin with sodium hydroxide to form the zeolite. Zeolitic catalysts made from a kaolin starting material are commercially available, including BASF Catalyst's in situ produced zeolitic catalysts made from a kaolin starting material as above described. The amount of zeolite formed in the composite catalyst may range from about 30 to about 70 weight percent, preferably at least about 40 weight percent.

The commercially available zeolite-containing catalysts made from kaolin starting materials have usually been subjected to at least one conventional cation exchange step to reduce the alkali metal content generally to slightly below 1 weight percent, calculated as the alkali metal oxide, based on the total catalyst. Typically, an ammonium cation exchange is conducted to reduce the sodium cation content of the catalyst. The ammonium-exchanged Y-type zeolite, including the kaolin derived matrix, is then contacted with a medium containing an anion selected from the group consisting of a dihydrogen phosphate anion ($H_2PO_4^-$), a dihydrogen phosphite anion ($H_2PO_3^-$) and mixtures thereof for a time sufficient to composite phosphorus, with the catalyst. Suitable amounts of phosphorus to be incorporated in the catalyst include at least about 0.5 weight percent, preferably at least about 0.7 weight percent, more preferably from about 1.0 to 2 weight percent, calculated as $P_2O_5$, based on the weight of the zeolite plus whatever matrix remains associated with the zeolite when it is prepared from kaolin.

The anion is derived from a phosphorus-containing component selected from the group consisting of inorganic acids of phosphorus, salts of inorganic acids of phosphorus, and mixtures thereof. Suitable phosphorus-containing components include phosphorous acid ($H_3PO_3$), phosphoric acid ($H_3PO_4$), salts of phosphorous acid, salts of phosphoric acid and mixtures thereof. Although any soluble salts of phosphorous acid and phosphoric acid, such as alkali metal salts and ammonium salts may be used to provide the dihydrogen phosphate or phosphite anion, it is preferable to use ammonium salts since the use of alkali metal salts would require subsequent removal of the alkali metal from the catalyst. Preferably, the anion is a dihydrogen phosphate anion derived from monoammonium phosphate, diammonium phosphate and mixtures thereof. Contact with the anion may be performed as at least one step of contacting or a series of contacts which may be a series of alternating and successive calcinations and dihydrogen phosphate or phosphite anion contacting steps.

Contact of the anion with the zeolite and kaolin derived matrix is suitably conducted at a pH ranging from about 2 to about 8. The lower pH limit is selected to minimize loss of crystallinity of the zeolite. The upper pH limit appears to be set by the effect of the anion concentration. Suitable concentrations of the dihydrogen phosphate or dihydrogen phosphite anion in the liquid medium range from about 0.2 to about 10.0 weight percent anion. The lower limit is chosen to provide the desired lower limit of phosphorus in the catalyst. The pH of treating solution can be adjusted by the addition of acid, such as nitric acid and the like. Although the upper limit is not critical, a concentration above the stated upper limit would not be necessary. The chosen concentration of the anion in the solution will also depend on the amount of solution used per weight of zeolite and matrix being treated. Treating time and temperatures are not critical and may range from about ambient temperature, that is, from 60° F. to about 250° F.

Subsequent to the addition of the phosphorous-containing compound, the catalyst is then exchanged with a rare earth cation from an aqueous solution of a rare earth soluble salt, as known in the art. Examples of rare earth compounds are the nitrates of lanthanum, cerium, praseodymium, neodymium, and the like. Other water soluble salts of rare earth compounds are known in the art and can be utilized. Typically, the amount of rare earth added to the catalyst as a rare earth oxide will range from about 0.5 to 10%, typically 0.5-5 wt. % REO. In general, the temperature of the impregnating solution will range from about 70-200° F. at a pH of from about 2-5. Although rare earth exchange is described above as taking place subsequent to the first phosphorus addition, the rare earth exchange can take place in a different sequence, as that described above. For example, rare earth exchange can be placed immediately after the first ammonium exchange and before phosphorus treatment.

Subsequent to the rare earth exchange, the rare earth exchanged catalyst is then dried and then calcined at a temperature of from 800°-1200° F. The conditions of the calcination are such that the unit cell size of the zeolite crystals is not significantly reduced. Typically, the drying step, after rare earth exchange, is to remove a substantial portion of the water contained within the catalyst, and calcination is conducted in the absence of added steam. The rare earth oxide-containing catalyst, subsequent to calcination, is now further acid exchanged, typically by ammonium ions to, again, reduce the sodium content to less than about 0.5 wt. % $Na_2O$. The ammonium exchange can be repeated to ensure that the sodium content is reduced to less than 0.5 wt. % $N_2O$. Typically, the sodium content will be reduced to below 0.2 wt. % as $Na_2O$. Subsequent to ammonium exchange, the reduced sodium catalyst containing the Y-type zeolite and the kaolin derived matrix is contacted again with a medium containing the phosphorus compounds as described above, with respect to the first phosphorus treatment. The medium contains sufficient phosphorus to provide a content of phosphorus as $P_2O_5$ of at least 2.0 wt. % and, more typically, an amount of phosphorus as $P_2O_5$ of 2.8 to 3.5 wt. % relative to the catalyst, including zeolite and kaolin derived matrix. Temperatures and pH conditions for the second phosphorus treatment are as in the first treatment described above. After phosphorus treatment, the impregnated catalyst is calcined again at temperatures of from 700°-1500° F. During this second calcination, some steam, up to about 25%, can be included in the oxidizing atmosphere to reduce the cell size of the zeolite crystals. In general, the zeolite, as crystalized, will have a unit cell size of from 24.65 to 24.75 Å. After the first calcination, the unit cell size remains in the stated range. After the second calcination, the unit cell size of the zeolite can be reduced to below 24.6 Å.

Example 1

Microsphere Preparation

A microsphere was prepared containing 37.5 parts of LHT hydrous kaolin clay, 62.5 parts of M-93 mullite-form calcined kaolin powder. To this mixture of hydrous and calcined kaolins was added 8 parts of $SiO_2$ added from N-brand™ sodium silicate. The hydrous kaolin source was a 60% solids slurry of LHT, a coarse co-product of the centrifuging of a so-called grey kaolin clay for 90% by weight of particles less than 1 micron in size. The slurry was fed to a spray dryer to form microspheres. The microspheres were calcined to convert the hydrous kaolin to metakaolin but without reaching the characteristic exotherm. The $Na_2O$ content was 3.06 wt. %, the acid solubles were 18.5 wt. %, the APS was 85 m, the ABD 0.55 gm/cc, and the Hg pore volume between 40 and 20,000 A diameter was 0.720 gm/cc. It is commercially prepared microsphere MS65.

Example 2

Crystallization

Example 1 was crystallized during 14 hours to form Zeolite Y by conventional procedures (U.S. Pat. No. 4,493,902 and U.S. Pat. No. 5,395,809). The seeds are described by U.S. Pat. No. 4,631,262. After the crystallization process is terminated, the microspheres containing ~55% Y-faujasite and ~45% matrix with ucs 24.71 Å, are separated from a substantial portion of their mother liquor by filtration. It was washed with water after the filtration step. The purpose of the washing step is to remove mother liquor that would otherwise be left entrained within the microspheres. The properties of as-crystallized and washed catalyst were as follows.

TABLE I

COMPOSITION OF SODIUM-FORM FCC CATALYST

| Sodium-form properties | |
|---|---|
| BET SA, $m^2/g$ | 417 |
| MSA, $m^2/g$ | 76.8 |
| ZSA | 340.2 |
| % NaY = ZSA/6.6 | 51.55 |
| $Na_2O$, wt % | 7.9 |
| ucs, Å | 24.666 |

Example 3

Ammonia Exchange

Example 2 was then added to 27 wt % ammonium nitrate solution at 180° F. at a pH of 3-3.5 while stirring and adding 50% $HNO_3$ dropwise to control pH. After all of the catalyst was added, the slurry was stirred for 30 mins, filtered and the cake was washed with twice the dry catalyst weight of de-ionized water. Two such exchanges were done where the weight ratio of catalyst to 27 wt. % ammonium nitrate was 1:2. The $Na_2O$ content at this point was 2.09%.

Comparative Example 4

600 grams Example 3 (volatile-free basis) was added to a solution containing 1200 g D.I. Water and 19 g Diammonium phosphate (ACS grade, 98%) at 180° F. at a pH of 3-3.5 while stirring and adding 50 wt. % $HNO_3$ dropwise to control pH. After all of the catalyst was added, the slurry was stirred for 30 mins and filtered and the cake was washed with twice the dry catalyst weight of de-ionized water. The $P_2O_5$ content at this point was 1.75 wt. %. The sample was then rare earth exchanged at 180° F. at a pH of 3-3.5 to yield about 1.36 wt. % $La_2O_3$ on the catalyst. The sample was dried and calcined at 950° F. in pre-heated furnaces for two hours in covered silica trays while initially containing 25 wt. % moisture. After calcination, the ammonium exchange procedure was repeated three times, and then calcined again at 25 wt. % moisture and 1050° F. to form a finished product. Its properties are shown in Table II below.

Example 5

Invention 600 grams Example 3 (volatile-free basis) was added to a solution containing 1200 g D.I. Water and 19 g Diammonium phosphate (ACS grade, 98%) at 180° F. at a pH of 3-3.5 while stirring and adding 50 wt. % $HNO_3$ dropwise to control pH. After all of the catalyst was added, the slurry was stirred for 30 mins and filtered and the cake was washed with twice the dry catalyst weight of de-ionized water. The $P_2O_5$ content at this point was 1.75 wt. %. The sample was then rare earth exchanged at 180° F. at a pH of 3-3.5 to yield about 1.36 wt. % $La_2O_3$ on the catalyst. The sample was dried and calcined at 950° F. in pre-heated furnaces for two hours in covered silica trays in the absence of added steam. After calcination, the ammonium exchange procedure was repeated five times. The resulting sample was added to a solution containing 1200 g D.I. Water and 19 g Diammonium phosphate (ACS grade, 98%) at 180° F. at a pH of 3-3.5 while stirring and adding 50 wt. % $HNO_3$ dropwise to control pH. After all of the catalyst was added, the slurry was stirred for 30 mins, filtered and the cake was washed with twice the dry catalyst weight of de-ionized water. The $P_2O_5$ content at this point was 3.56 wt. %. The sample was dried and then calcined again in the absence of added steam and 1050° F. to form the finished product. Its properties are shown in Table II below.

Comparative Example 6

200 grams Example 3 (volatile-free basis) was rare earth exchanged at 180° F. at a pH of 3-3.5 to yield about 1.28 wt. % $La_2O_3$ on the catalyst. The sample was dried and calcined at 950° F. in pre-heated furnaces for two hours in covered silica trays while initially containing 25 wt. % moisture. After calcination, the ammonium exchange procedure was repeated three times. The resulting sample was added to a solution containing 400 g D.I. Water and 11 g Diammonium phosphate (ACS grade, 98%) at 180° F. at a pH of 3-3.5 while stirring and adding 50wt. % $HNO_3$ dropwise to control pH. After all of the catalyst was added, the slurry was stirred for 30 mins, filtered and the cake was washed with twice the dry catalyst weight of de-ionized water. The $P_2O_5$ content at this point was 3.74wt. %. The sample was dried and then calcined again at 25 wt. % moisture and 1050° F. to form the finished product. Its properties are shown in Table III below.

Comparative Example 7

Example 3 was rare earth exchanged at 180° F. at a pH of 3-3.5 to yield about 1.28 wt. % $LaO_3$ on the catalyst. The sample was dried and calcined at 950° F. in pre-heated furnaces for two hours in covered silica trays while initially containing 25 wt. % moisture. After calcination, the ammonium exchange procedure was repeated three times, and then calcined again at 25 wt. % moisture and 1050° F. to form the finished product. Its properties are shown in Table III below.

The properties of the finished and steam-deactivated products are shown in the following table:

TABLE II

PROPERTIES OF FINISHED AND STEAM-DEACTIVATED FCC CATALYST

| | Example 4 | Example 5 | Example 6 | Example 7 |
|---|---|---|---|---|
| Finished products | | | | |
| % $Na_2O$ | 0.13 | 0.11 | 0.12 | 0.14 |
| wt. % $La_2O_3$ | 1.26 | 1.24 | 1.22 | 1.30 |
| wt. % $P_2O_5$ | 1.71 | 3.56 | 3.74 | 0.07 |
| TSA $m^2/g$ | 365 | 351 | 368 | 362 |
| MSA $m^2/g$ | 96 | 84 | 79 | 102 |
| ZSA $m^2/g$ | 269 | 267 | 289 | 260 |

TABLE II-continued

PROPERTIES OF FINISHED AND STEAM-DEACTIVATED FCC CATALYST

| | Example 4 | Example 5 | Example 6 | Example 7 |
|---|---|---|---|---|
| Steamed at 1450° F./24 hrs, 100% steam | | | | |
| TSA $m^2/g$ | 200 | 190 | 193 | 203 |
| MSA $m^2/g$ | 45 | 48 | 45 | 60.1 |
| ZSA $m^2/g$ | 145 | 142 | 148 | 142.9 |

Measurement of Catalyst Activity

Catalytic performance was determined using an ACE™ microscale fixed fluidized bed unit operating at 1000° F. (Table IV), using 9 grams of catalyst a gas oil feed (Table III), substantially as described in U.S. Pat. No. 6,069,012 with the 2.125" injector position. The catalyst strip time was held constant at 575 seconds. The oil injection rate is 1.2 g/min.

TABLE III

FEED PROPERTIES

| Gas Oil Feed Properties | |
|---|---|
| IBP (° F.) | 267 |
| 5% | 578 |
| 50% | 805 |
| 95% | 1017 |
| FBP (° F.) | 1122 |
| Concarbon | 0.26 |
| API @ 60° F. | 24.19 |
| Pour Point (° F.) | 102 |
| Aniline Point (° F.) | 186 |
| basic N, ppm | 298 |
| total N, ppm | 978 |
| Ref. Index @ 25° C. | 1.5044 |
| Sulfur, % | 0.74 |

TABLE IV

ACTIVITIES AND SELECTIVITIES

| | Example 4 | Example 5 | Example 6 | Example 7 |
|---|---|---|---|---|
| H2 | 0.12 | 0.10 | 0.11 | 0.12 |
| C3=/Total C3s | 0.86 | 0.84 | 0.85 | 0.87 |
| C4=/Total C4s | 0.60 | 0.57 | 0.58 | 0.64 |
| Total C2— | 2.03 | 2.00 | 2.04 | 2.08 |
| LPG | 20.31 | 19.78 | 20.69 | 21.08 |
| Total C4— | 22.34 | 21.78 | 22.73 | 23.16 |
| Gasoline | 49.66 | 50.36 | 49.43 | 49.09 |
| LCO | 14.40 | 14.73 | 13.98 | 15.20 |
| HCO | 10.60 | 10.27 | 11.02 | 9.80 |
| Coke | 3.00 | 2.86 | 2.83 | 2.75 |
| Conversion | 75 | 75 | 75 | 75 |
| Cat/Oil | 6.97 | 5.48 | 6.16 | 8.00 |
| Activity @ Cat/Oil = 5 | 2.20 | 2.82 | 2.53 | 1.85 |
| Conversion @ Cat/Oil = 5 | 68.73 | 73.80 | 71.64 | 64.91 |
| Activity @ Cat/Oil = 7 | 3.01 | 3.58 | 3.34 | 2.89 |
| Conversion @ Cat/Oil = 7 | 75.09 | 78.17 | 76.96 | 74.27 |

The invention claimed is:

1. A process for modifying an FCC zeolite catalyst with phosphorous comprising: exchanging an as-crystalized catalyst with an ammonium salt, so as to provide the catalyst with a sodium content of less than about 2% by weight $Na_2O$, treating the ammonium-exchanged catalyst with a first phosphate solution, sufficient to add 0.5 to 2% by weight $P_2O_5$ on the catalyst, ammonium ion exchanging the phosphorous treated catalyst to yield a low sodium catalyst having a sodium content as $Na_2O$ to less than about 0.5 wt. %, and treating the low sodium catalyst with a second phosphate solution, sufficient to provide the catalyst with 2-4 wt. % $P_2O_5$ on the catalyst.

2. The process of claim 1, comprising ion exchanging the catalyst with rare earth cations, either subsequent to the first ammonium ion exchange or subsequent to the first phosphorous treatment to incorporate 0.5 to 10 wt. % of rare earth, as rare earth oxides in said catalyst.

3. The process of claim 2, wherein the catalyst is a Y-type zeolite.

4. The process of claim 3, wherein the Y-type zeolite is formed in-situ from kaolin and an additional source of silica.

5. The process of claim 3, wherein subsequent to rare earth exchange, the catalyst is calcined at calcination conditions such that the unit cell size of the Y-type zeolite is not significantly reduced.

6. The process of claim 5, wherein said calcination is conducted in the absence of added steam.

7. A phosphorous modified catalyst prepared by the process of claim 6.

8. The phosphorous modified catalyst of claim 7, containing about 2.8 to 3.5 wt. % of $P_2O_5$ relative to the catalyst.

9. The phosphorous modified catalyst of claim 7, containing about 0.5 to 10 wt. % rare-earth metals as rare earth oxides in said catalyst.

10. The phosphorous modified catalyst of claim 7, wherein the Y-type zeolite is formed in-situ from kaolin and an additional source of silica.

11. The process of claim 2, wherein the rare earth cations are exchanged subsequent to the first phosphate treatment.

12. The process of claim 1, wherein the low sodium catalyst has a sodium content as $Na_2O$ of below about 0.2 wt. %.

13. The process of claim 1, wherein the phosphorous content of the catalyst, upon the second phosphorous treatment, is from about 2.8-3.5 wt. % as $P_2O_5$ relative to the catalyst.

14. The process of claim 1, wherein the catalyst is a Y-type zeolite.

15. A phosphorous modified catalyst prepared by the process of claim 1.

16. The phosphorous modified catalyst of claim 15, containing about 2.8 to 3.5 wt. % of $P_2O_5$ relative to the catalyst.

17. The phosphorous modified catalyst of claim 15, containing about 0.5 to 10 wt. % rare-earth metals as rare earth oxides in said catalyst.

18. The phosphorous modified catalyst of claim 15, wherein the catalyst is a Y-type zeolite.

19. The phosphorous modified catalyst of claim 18, wherein the Y-type zeolite is formed in-situ from kaolin and an additional source of silica.

* * * * *